Sept. 15, 1964 J. J. KING 3,149,314

CORE MEMORY ADDRESSING

Filed April 12, 1962 2 Sheets-Sheet 1

INVENTOR.
JOHN J. KING
BY S. C. Yeaton
ATTORNEY

INVENTOR.
JOHN J. KING
BY
S. C. Yeaton
ATTORNEY

United States Patent Office 3,149,314
Patented Sept. 15, 1964

3,149,314
CORE MEMORY ADDRESSING

John J. King, Great Neck, N.Y., assignor to Sperry Rand Corporation, Great Neck, N.Y., a corporation of Delaware Filed Apr. 12, 1962, Ser. No. 186,916
7 Claims. (Cl. 340—174)

Figure 1A:
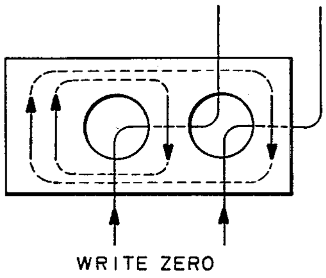

This invention relates in general to magnetic core memory devices and in particular to the wiring and addressing of a core memory matrix adapted to have its stored data sensed without adversely affecting, i.e. destroying, the data. In providing such a memory device, use is made of bi-aperture core elements such as are shown and described in U.S. Patent 2,994,069, each of these elements requiring, as is known, priming before having its stored data sensed, i.e. read (see U.S. Patent 2,803,812).

The present invention, while admittedly employing the prior art PRIME and READ operations, does so in a manner which provides at least two desired features, each of which tends to be inconsistent with the other, viz. temperature insensitivity and miniaturing of equipment.

*Temperature insensitivity.*—Because the hysteretic properties of magnetic core elements vary with temperature, i.e. an increasing ambient temperature decreases the size of the hysteresis curve of a core element and vice versa, addressing a core memory matrix by means of known coincident current techniques requires that such currents be controlled within close limits: with too small currents, addressing may not be effected; with too large currents, addressing other than an intended element may occur. By means of the invention, addressing currents may be made large enough to assure successful addressing under the most adverse temperature conditions, this to be described in detail later.

*Miniaturing of equipment.*—Unlike the prior art which requires for matrix addressing two coincident half-select current producing circuits to prime a selected core element and a separate circuit to read that element (see, for example, U.S. Patent No. 2,898,581, FIG. 9), apparatus embodying the invention employs one full current priming circuit which half-selects a core element and but one more circuit that provides the other (full current) "half-selection" necessary to read the element.

Bi-aperture elements such as are described in U.S. Patent 2,994,069 have two narrow readily saturable legs and one wide leg requiring for saturation at least twice the flux necessary to saturate a narrow leg; each such element has magnetic fields of the same direction in its narrow legs when in a first storage condition, e.g when storing a ZERO, and fields of opposite directions in those legs when in a second storage condition, e.g. when storing a ONE.

To provide the aforementioned features, a matrix of bi-aperture elements is wired and addressed in the following manner: cores are arranged in columns and rows; leads (one for each column) are threaded then to link a narrow leg of each core in respective columns; then leads (one for each row) are threaded to link the free narrow leg of each core in respective rows. When addressing, the element at the selected address has one of its leads excited to cause a field to be produced in the leg linked which is counter to the direction of the field in that leg when the element is in the aforementioned second storage condition, such field being also in a direction which is the same as the field in that leg when in the aforementioned first storage condition; then the other lead which links that element is excited to produce a field (in the leg which it links) which has the same direction as the field produced by the other lead, this last named requirement being essential to the invention.

When an element stores for example a ZERO, addressing in this manner causes the fields in the narrow legs of an addressed element to remain unchanged; when the element stores a ONE, however, such addressing causes the fields in the addressed element to change each time one of its leads is excited.

A principal object of the invention is to provide a magnetic core memory device which non-destructively stores data and is substantially insensitive to variations in ambient temperature.

Another object of the invention is to provide a magnetic core memory device which obviates the need for half-select coincident current techniques.

Another object of the invention is to provide a magnetic core memory matrix of bi-aperture elements requiring for addressing and reading the excitation of only two conductors.

Figure 1B:
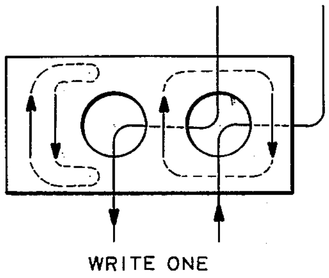
Figure 2:
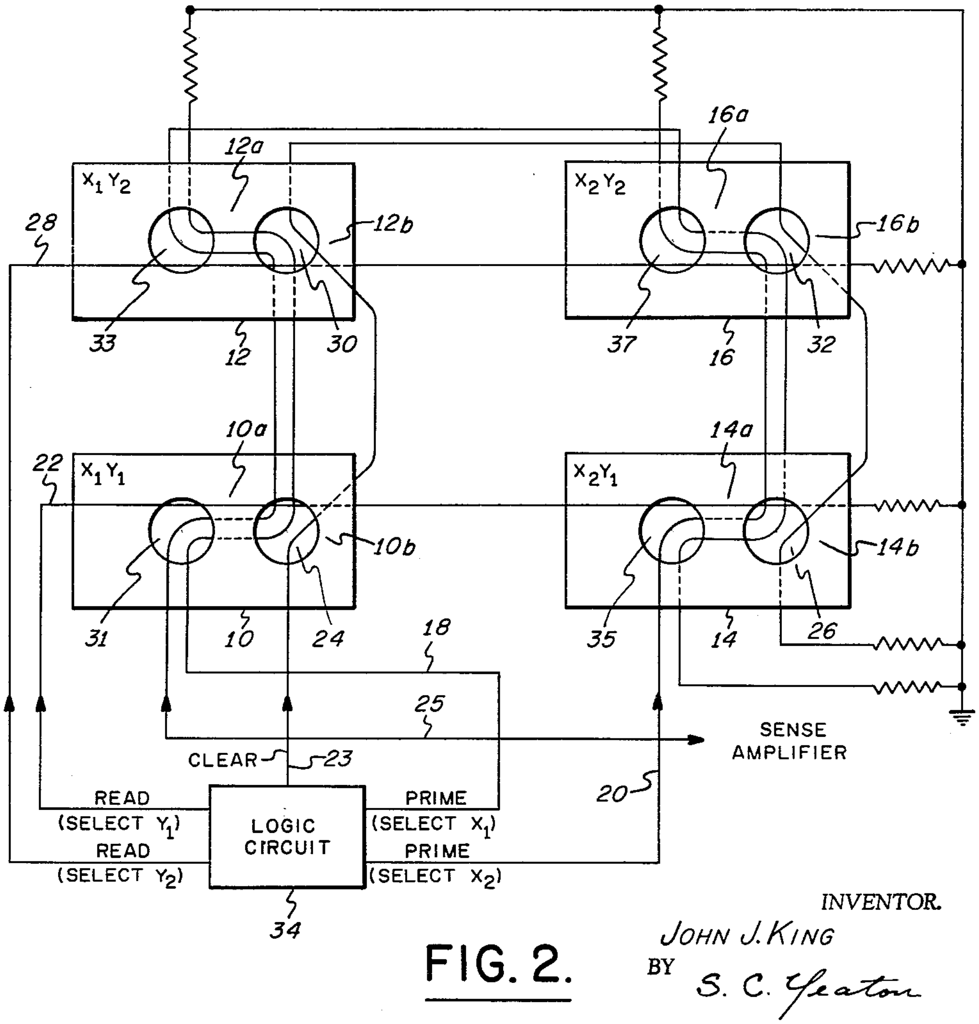
Figures 3, 4:
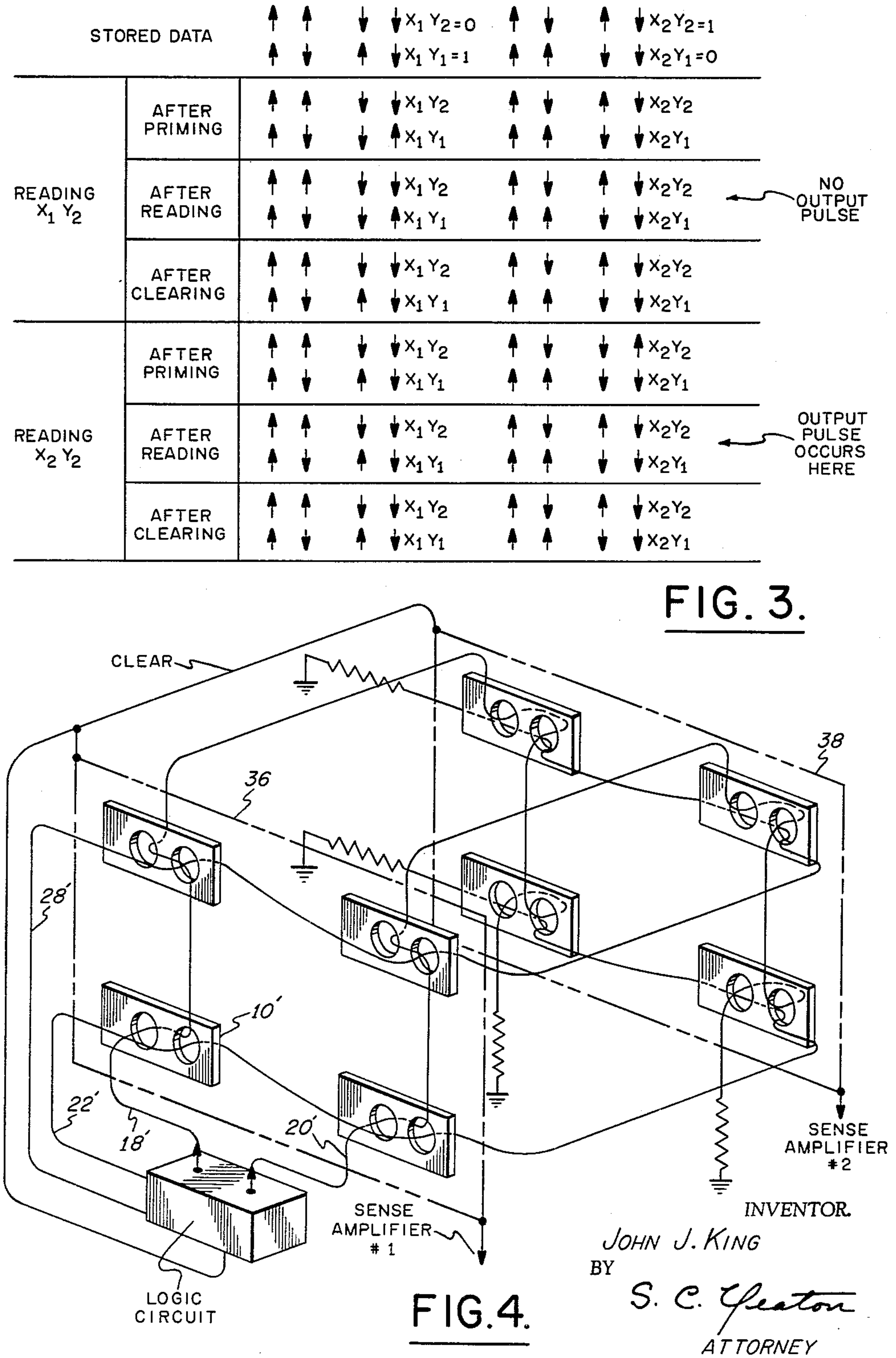

The invention will be described with reference to the figures wherein:

FIGS. 1A and 1B depict bi-aperture magnetic core elements being excited to store different forms of data, e.g. a ZERO and a ONE respectively, FIG. 2 is a schematic diagram of a circuit embodying the invention, FIG. 3 is a diagram useful in explaining the operation of the circuit of FIG. 2, and FIG. 4 shows a three dimensional matrix of bi-aperture elements embodying the invention.

The invention is concerned solely with deriving stored data from a core memory device consisting of bi-aperture magnetic core elements, being in no way concerned with the manner of writing data into such a device. However, FIGS. 1A and 1B are provided to show how individual core elements may be set up initially to store different forms of data, e.g. ZEROS and ONES. In FIG. 1A, a bi-aperture element is shown with conductors passing through each of its apertures; with currents passing simultaneously through each conductor in the directions shown, magnetic fields having particular, i.e. "ZERO," directions (as shown by arrows on the element) are provided. Similarly, the core element of FIG. 1B has two conductors threaded through its apertures, such conductors simultaneously carrying currents in the directions shown to provide magnetic fields having particular, i.e. "ONE," directions (as indicated by arrows on the element).

Referring now to FIG. 2, a basic core memory circuit embodying the invention has four bi-aperture core elements 10, 12, 14 and 16. A lead 18, threaded through one aperture of the element 10 and out the other aperture of that element is threaded then into and out of the apertures of the element 12, being then brought to ground through a resistor. The lead 18 is so wound in and out of the apertures of the elements 10 and 12 to cause flux produced in the legs 10*a* and 12*a* of those elements (by the current in lead 18) to be driven downward when the lead 18 passes current in the direction indicated. Likewise, the core elements 14 and 16 have a lead 20 threaded in and out of their respective apertures to cause flux produced in their respective legs 14*a* and 16*a* to be driven downward when the lead 20 passes current in the direction shown.

A lead 22, adapted to pass current in the direction shown, threads into the aperture 24 of the element 10 and into the aperture 26 of the element 14 to drive flux in the legs 10*b* and 14*b* of those elements respectively downward. Similarly, a lead 28 is threaded into and out of the apertures 30 and 32 of the elements 12 and 16 respectively to drive flux in the legs 12*b* and 16*b* of those elements downward when that lead carries current in the direction shown. A lead 23, threaded through the apertures 24, 30, 32 and 26 and adapted to carry current in the direction shown, causes flux (produced by its current) to be driven downward in the legs 10b, 12b, 16b and 14b. A sense winding 25 threads through the apertures 31, 33, 35 and 37 of the elements 10, 12, 14 and 16 respectively to sense when the fields in the narrow legs of those elements change. (Of course, the sense winding can also thread through the apertures 24, 30, 26 and 32 and still sense such changing fields properly.) A logic circuit 34, forming no part of the invention but consisting, for example, of AND, OR, and NOT circuits, selectively excites first either the lead 18 or the lead 20, and then excites either the lead 22 or the lead 28.

The operation of the apparatus of FIG. 2 will now be described with reference to FIG. 3 which shows under the title STORED DATA arrows representing the flux directions in the wide and the two narrow legs of the elements 10, 12, 14 and 16 when storing respectively 1, 0, 0 and 1, i.e. the elements at coordinate locations $X_1Y_1$, $X_1Y_2$, $X_2Y_1$ and $X_2Y_2$ store respectively 1, 0, 0 and 1. In reading, for example, the data stored by the element at location $X_1Y_2$, the lead 18 is excited, this causing the flux patterns in the respective elements to change as shown under the title AFTER PRIMING, i.e. the flux in the leg 10a by being driven downward causes the flux in the leg 10b to be driven upward. Then, the lead 28 is excited. Since the flux in the legs 12b and 16b are already downward when the lead 28 is excited, no change in the flux patterns of the respective elements occurs at this time, the result being that no output pulse is produced, i.e. a ZERO has been read. However, since the element 10 has its flux pattern inverted (by the reading operation), the lead 23 is excited to drive the flux in the leg 10b downward, thereby causing the flux pattern in the element 10 to be restored to its original form. Since all other legs (12b, 16b, and 14b) linked by the lead 28 already have their respective flux directed downward, the element 10 alone has its pattern changed at this time.

To read the element 16a at coordinate location $X_2Y_2$, the lead 20 is excited. This causes the flux pattern in the element 16a to change from its original state, i.e. the flux in the leg 16a is driven downward to cause the flux in the leg 16b to shift upward. However, since the flux in the leg 14a linked by the lead 20 is already directed downward, the flux pattern in the element 14 is unaffected at this time. Then the lead 28 is excited, causing the flux in the element 16 legs to reassume their original directions. As this occurs, a pulse is developed on the sense winding 25 to indicate that the addressed element 16 stores a ONE. Since the flux in the leg 12b is already downward in direction when the lead 28 is excited, i.e. in the direction in which the lead 28 tries to drive flux, no output pulse is developed from changing fields in the element 12 legs. By exciting the clearing lead 23 now, no change in any of the field patterns of the respective elements occurs, this being because all elements have the flux in their respective legs 10b, 12b, 14b and 16b oriented in the very direction, i.e. downward, in which the lead 23 tries to drive flux.

As seen from the above, half-select coincident currents are unnecessary for selectively reading a particular addressed matrix element, i.e. pulsing the row and column of a particular element addresses and reads only that element.

Because the lead 18 or the lead 20 operates to drive flux in a given element leg in a direction which is the same for a stored ZERO (in that element), but opposite for a stored ONE, the currents carried by either of those leads may be made substantial (to compensate for changes in the element switching point because of temperature variations) without fear of destroying stored data, i.e. pulsing the leads 18 and 20 has no effect on elements storing ZEROS and "fully" primes elements storing ONES. Likewise, when the lead 22 or the lead 28 is pulsed substantially, an element linked thereby and storing a ZERO or a ONE which has not been primed has its flux pattern unaffected; however, an element storing a primed ONE produces an output signal.

FIG. 4 shows how the apparatus of FIG. 2 may be embodied in a three dimensional matrix having two planes 36 and 38, each of which is wired as shown in FIG. 2. A prime lead 18' excites the one column in the different planes; similarly, the lead 20' excites a different column in the different planes. The read leads 22' and 28' likewise excite particular rows of elements in the two planes. Respective clear and sense leads (shown functionally connected for clarity) thread serially through each element in the respective planes 36 and 38. Typical operation: By exciting the lead 18' and then the lead 22', the data stored in the elements 10' and 10'' is read out simultaneously and applied to sense amplifiers 1 and 2. By applying a current to the clear leads, all elements are restored to their initial storage conditions.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A core memory matrix comprising a plurality of ferromagnetic storage elements each of which is provided with two apertures so positioned to provide each element with two narrow legs saturable magnetically and a wider leg requiring at least as much flux for saturation as both narrow legs together require for their saturation, a first lead threaded to link a narrow leg of all said elements, said first lead being adapted to be excited to drive flux in a linked leg of a given element in a direction which is counter to the direction of the flux in that leg when the element stores a first form of data but in the same direction as the flux in that leg when it stores a second form of data, a plurality of leads each respectively threaded to link the free narrow leg of an element, each of said last-named leads being adapted to be excited to drive flux in the linked leg of its respective element in a direction which is the same as the direction of flux in that leg when that element stores either form of data, means adapted to excite said first lead and then the other lead of an element the stored data of which is desired to be determined, and means responsive to sense changing flux directions in said elements when any one of said plurality of leads is excited.

2. A core memory device comprising a plurality of bi-aperture magnetic core elements each having two narrow and one substantially wider leg, each said element being adapted to store a first form of data by being magnetized to have the flux in the wider leg flow in one direction and the flux in both narrow legs flow in directions opposite the flux direction in the wider leg, each said element being further adapted to store a second form of data by being magnetized to have the flux in the narrow legs flow in counter directions, said elements being arranged in groups of equal numbers, a first plurality of conductors, one for each group, each of which is adapted to pass through an aperture in each element of its respective group of elements, a second plurality of conductors, one for each element in a group, each of which is adapted to pass through the free aperture of one element in each group, means for selectively exciting a conductor in said first plurality of conductors to cause flux in the element legs linked thereby to be directed counter to the directions of flux in those legs when their respective elements store said second form of data but in the same direction as the flux in those legs when their respective elements store said first form of data, and means for selectively exciting a conductor in said second plurality of conductors to cause flux in the element legs linked thereby to be directed in the same direction as the flux in those legs when their respective elements store both forms of data.

3. A memory device comprising, (a) first and second pairs of bi-aperture magnetic core elements each element of which has its apertures positioned to provide two narrow and one wider leg, said wider leg requiring for saturation at least as much flux as is necessary to saturate simultaneously both narrow legs, (b) a first conductor threaded through an aperture in each element in said first pair, (c) a second conductor threaded through an aperture in each element of said second pair, (d) a third conductor threaded through the free apertures of one element in said first pair and one element in said second pair, (e) a fourth conductor threaded through the free aperture of an element in said first pair and the free aperture of an element in said second pair, (f) means for selectively exciting the first or the second conductor to drive flux in the legs that they are respectively inductively coupled to in directions counter to the fields in those legs when those elements respectively store one form of data and in the same directions as the fields in those legs when those elements respectively store a different form of data.

(g) means for selectively exciting the third and fourth conductors to drive flux in the legs that they are respectively inductively coupled to in directions which are the same as the flux directions in those legs when they respectively store either form of data, (h) and means responsive to sense changing fields in all said elements when either said third or fourth conductors are excited.

4. A memory device comprising, (a) first and second pairs of bi-aperture magnetic core elements each element of which has its apertures positioned to provide two narrow and one wider leg, said wider leg requiring for saturation at least as much flux as is necessary to saturate simultaneously both narrow legs, (b) a first conductor threaded through an aperture in each element in said first pair, (c) a second conductor threaded through an aperture in each element of said second pair, (d) a third conductor threaded through the free apertures of one element in said first pair and one element in said second pair, (e) a fourth conductor threaded through the free aperture of an element in said first pair and the free aperture of an element in said second pair, (f) means for selectively exciting the first or the second conductor to drive flux in the legs that they are respectively inductively coupled to in directions counter to the fields in those legs when those elements respectively store one form of data and in the same directions as the fields in those legs when those elements respectively store a different form of data.

(g) means for selectively exciting the third and fourth conductors after either said first or second conductor is excited to drive flux in the legs that they are respectively inductively coupled to in directions which are the same as the flux directions in those legs when they respectively store either form of data, (h) and a conductor threaded to couple inductively a narrow leg of all said elements, whereby changing fields in said elements may be sensed.

5. A core memory device comprising, (a) first and second pairs of bi-aperture elements, each element of each pair having a right and left aperture positioned to provide right and left narrow legs to one side of a wider leg, said wider leg requiring for saturation at least as much flux as is required to saturate simultaneously both narrow legs, (b) a first conductor threaded into one aperture and out the other of each element in said first pair of elements, (c) a second conductor threaded into one aperture and out the other of each element in said second pair of elements, (d) a third conductor threaded respectively through the aperture farthest from the wider leg of a first element in each of said first and said second pairs of elements, (e) a fourth conductor threaded respectively through the aperture farthest from the wider leg of a second element in each of said first and second pairs of elements, (f) means for selectively exciting said first or said second conductor to drive flux in the central narrow legs of the elements linked by the excited conductor in a direction counter to the direction of flux in those legs when their respective elements store one form of data but in a direction which is the same as the direction of flux in the other narrow legs of those elements when they store respectively either said one form of data or another form of data, (g) means for selectively exciting either said third or said fourth conductor to drive flux in the legs linked by those conductors in directions which are the same as the flux directions in those legs when the elements linked thereby store either form of data, and (h) means responsive to changing fields in all said elements to produce an output signal when the flux pattern in any element changes, whereby said last named means produced an output signal whenever one of said elements has the conductor linked to its central leg excited and then the conductor linked to its other leg excited.

6. A core memory device comprising, (a) first and second pairs of bi-aperture elements, each element of each pair having a right and left aperture positioned to provide right and left narrow legs to one side of a wider leg, said wider leg requiring for saturation at least as much flux as is required to saturate simultaneously both narrow legs, (b) a first conductor threaded into one aperture and out the other of each element in said first pair of elements, (c) a second conductor threaded into one aperture and out the other of each element in said second pair of elements, (d) a third conductor threaded respectively through the aperture farthest from the wider leg of a first element in each of said first and said second pairs of elements, (e) a fourth conductor threaded respectively through the aperture farthest from the wider leg of a second element in each of said first and second pairs of elements, (f) means for selectively exciting said third or said fourth conductor to drive flux in the narrow legs, which are farthest from their respective wide legs, of the elements linked by the excited conductor in a direction counter to the direction of flux in those legs when their respective elements store one form of data but in a direction which is the same as the direction of flux in the other narrow legs of those elements when they respectively store either said one form of data or another form of data, (g) means for selectively exciting either said first or said second conductor to drive flux in the central legs linked by those conductors in directions which are the same as the flux directions in those legs when the elements inductively coupled thereto store either form of data, and (*h*) means responsive to changing fields in all said elements to produce an output signal when the flux pattern in any element changes, whereby said last-named means produces an output signal whenever one of said elements has the conductor linked to its central leg excited after the conductor linked to its other leg is excited.

7. The apparatus of claim 2 including a conductor threaded to link the leg of each core element which has flux therein having the same direction for either form of data, said conductor being adapted to be excited to drive the flux in those legs always in that direction.

No references cited.